Figure 1:
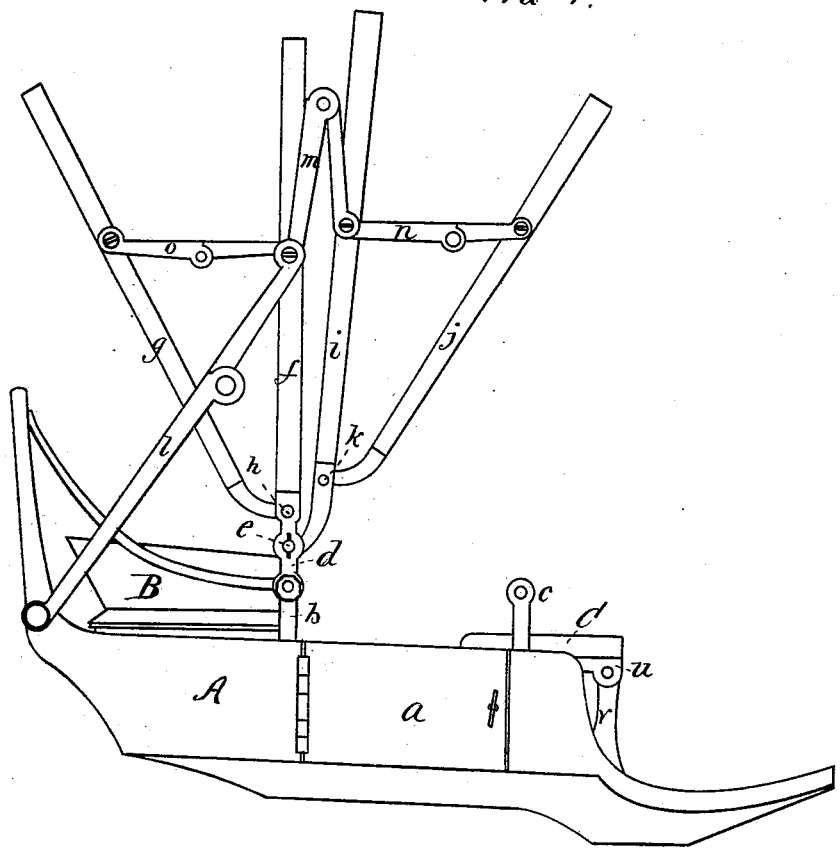

E. S. FELTCH.
Carriage.

No. 217,931. Patented July 29, 1879.

4 Sheets—Sheet 2.

E. S. FELTCH.
Carriage.

No. 217,931. Patented July 29, 1879.

WITNESSES.
Samuel D. Kelley,
George B. Haskell.

INVENTOR.
Elbridge S. Feltch
By Porter & Hutchinson
Attys

4 Sheets—Sheet 3.

E. S. FELTCH.
Carriage.

No. 217,931. Patented July 29, 1879.

WITNESSES.
Samuel D Kelley.
George B. Haskell

INVENTOR.
Elbridge S. Feltch
By Porter & Hutchinson
Attys.

4 Sheets—Sheet 4.
E. S. FELTCH
Carriage.
No. 217,931. Patented July 29, 1879.
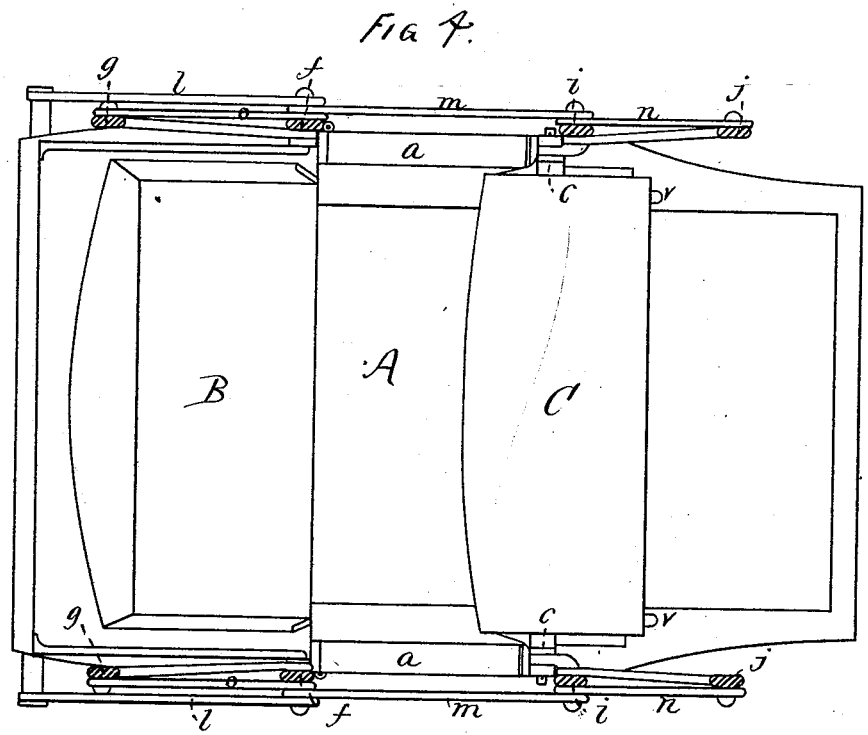
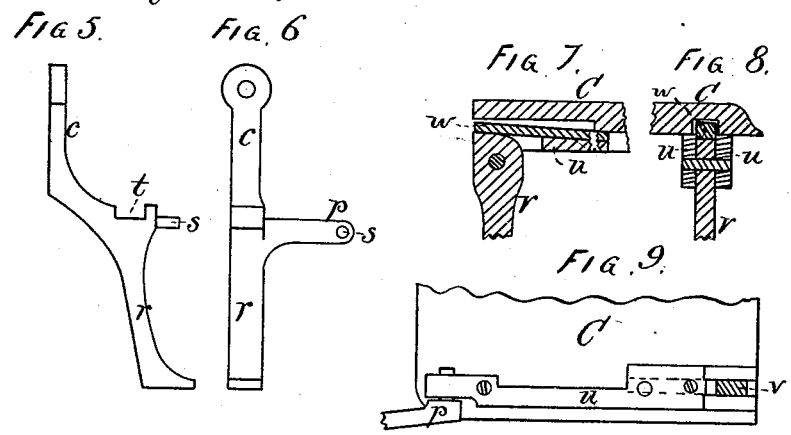
WITNESSES.
Samuel D. Kelley.
George B. Haskell.
INVENTOR.
Elbridge S. Feltch
By Porter & Hutchinson
Attys

UNITED STATES PATENT OFFICE.

ELBRIDGE S. FELTCH, OF SALISBURY, MASSACHUSETTS.

IMPROVEMENT IN CARRIAGES.

Specification forming part of Letters Patent No. 217,931, dated July 29, 1879; application filed August 26, 1878.

*To all whom it may concern:*

Be it known that I, ELBRIDGE S. FELTCH, of Salisbury, State of Massachusetts, have invented Improvements in Carriages, of which the following is a specification.

This invention relates to that class or kind of vehicles which are known as "jump-seat carriages," in which there are two seats, one being arranged in front of the other, the front seat being known as a "turn-down" or "fold-down" seat, and the other as a "jump" or "sliding" seat, they being so constructed and arranged that when the forward seat is in position for use the jump-seat is in its rearmost position, so as to leave room for its occupants between it and the front seat; but when such front seat is turned or folded down, the rear seat may be moved forward to near the center of the body, so as to be used as the single seat of the vehicle, such carriages having been heretofore made either as open carriages—that is, without a top or shelter for the occupant—or else with a canopy-top, being a top supported upon pillars, and not susceptible of being removed or turned down.

My invention consists in the combination, in a carriage having such jump-seat and a folding or turn-down seat, of an extensible turn-down top, so combined and arranged relatively to the body and to said seats that the front seat may be thus folded or turned down, and the back seat jumped back or forward without in any manner interfering with or changing the position of the top; and the top may be extended to cover both seats, or be curtailed by folding back the extensible portion, so as to cover only the back seat when it is in its rearmost position; or it may be turned entirely back, so as not to cover either seat, as may be desired, such top being so formed and connected directly with the carriage-body, instead of the seats, as heretofore, as to be removable therefrom, for the purpose of close packing in case of shipment for the saving of freight expenses; and it may, if desired, be so constructed as to be removable in the manner of "shifting tops" having a "shifting-rail."

In the accompanying drawings my present invention is shown in connection with seats embodying features of my former invention, embraced in Letters Patent No. 184,236, dated November 14, 1876; but my present invention is not confined to that or any specific kind of jump-seat, it being applicable to carriages having any kind of such seats.

Figure 2:
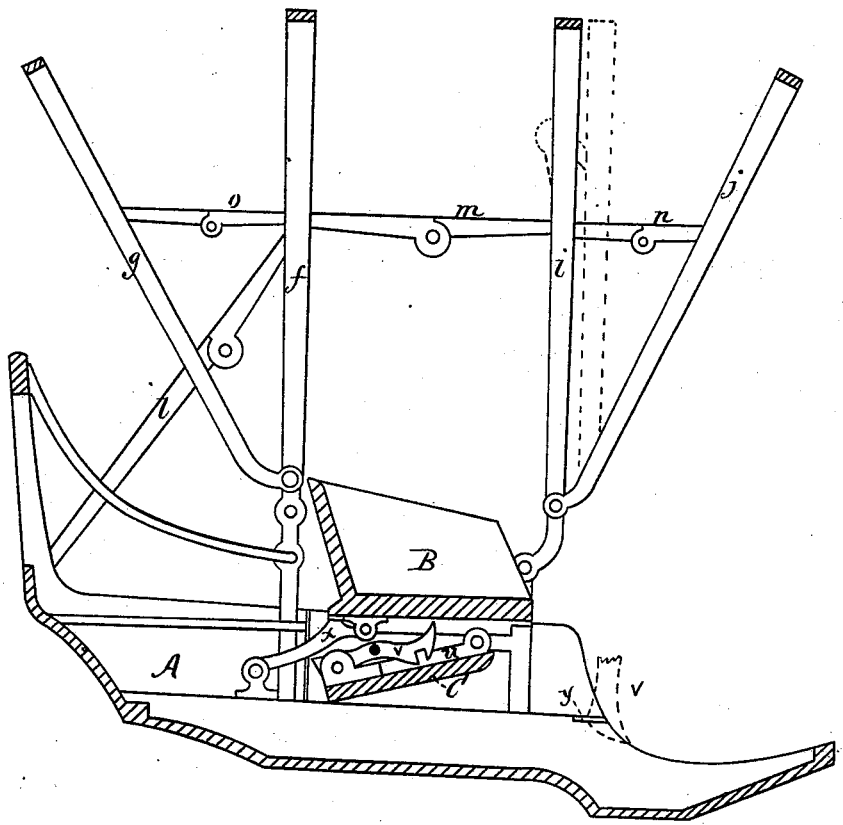
Figure 3:
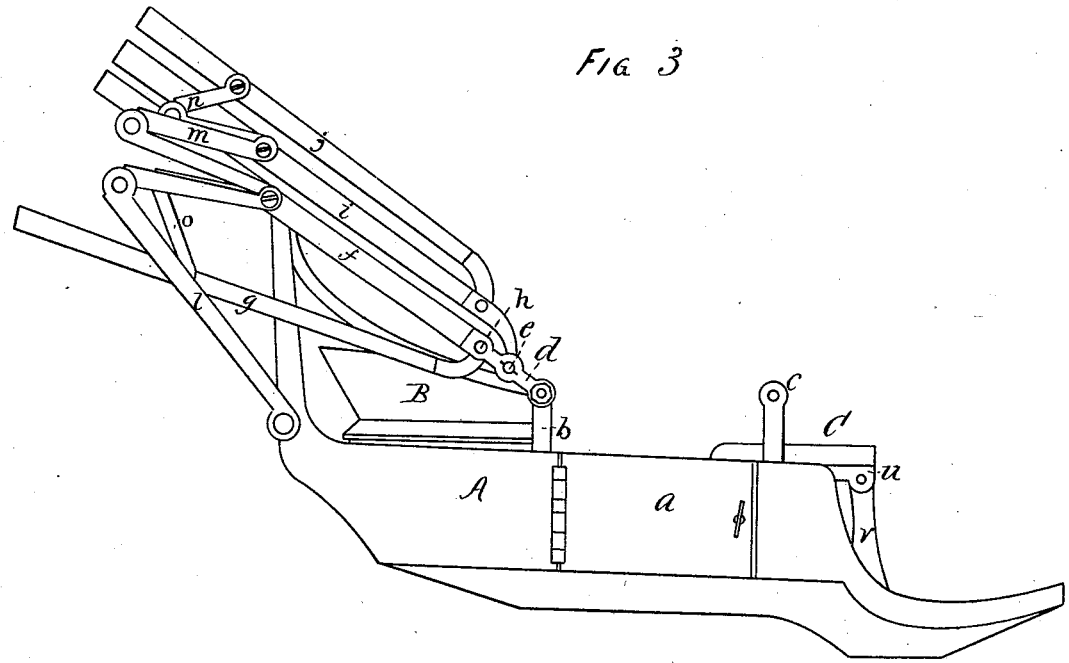

In said drawings, Figure 1 is a side elevation of a carriage with both seats in position for use, and with the top folded back to serve as a cover for the back seat only. Fig. 2 shows the same carriage in longitudinal vertical section and as viewed from the right hand of the vehicle, the front seat folded down, the back seat jumped forward, and the top extended to cover it, and as if to cover both seats when in use. Fig. 3 is an elevation similar to Fig. 1, but showing the top turned down, leaving both seats open. Fig. 4 is a top view with both seats in position for use and with the top fully extended, but shown in horizontal section taken just above the top-joints. Fig. 5 is a front elevation of an improved supporting-iron for the seat and top. Fig. 6 is an elevation of the same as viewed from the right of Fig. 5. Fig. 7 is a vertical detached section of the hinge-bar, taken in the axial line of the enlarged portion thereof, and showing the front seat, C, in transverse section. Fig. 8 is a vertical section taken transversely to the spring and hinge-bar. Fig. 9 is a detached under-side view, showing a portion of the front seat, the hinge-bar secured thereon, and the seat-prop in horizontal section, the engaging-spring being shown in dotted lines.

In these figures, A represents the body, B the back seat, and C the front seat, all of which may be of any desired pattern of suitable adaptability for a jump-seat carriage. $a$ is a low-hinged door, which may be employed, or "cut-down" sides used instead, for convenience of entering and leaving the vehicle when both seats are in position for use. $b$ is the back, and $c$ the front, supporting-irons, to which the top-bows are attached as follows:

The slat-iron $d$, secured to the back inside bow, $f$, is pivoted in supporting-iron $b_r$ (the latter being rigidly secured to the body,) and the back bow $g$ is pivoted by its slat-iron to $d$ at $h$.

When the top is fully extended the front inner bow, $i$, is pivoted in support $c$, as shown in Fig. 2; but when it is desired to fold back the front of the top, the slat-iron of bow $i$ is pivoted in $d$ at $e$, as shown in Figs. 1 and 3. The front bow, $j$, is pivoted in the slat-iron of bow $i$ at $k$, as shown in Figs. 1, 2, 3. Thus the top may be fully extended, as shown in Figs. 2 and 4, whether one seat is used, as in Fig. 2, or both are used, as shown in Fig. 4, and when both seats are used the top may be folded back, as shown in Fig. 1, so as to cover only the back seat; and whether one or both seats are used the top may be turned down, as shown in Fig. 3, all which positions of the top are independent of the seats or the positions thereof, the position of the top not being determined by that of the seat, as heretofore, when such tops were attached directly to the seats.

The usual top-joints $l$ $m$ $n$ are employed to retain the bows in the required extended positions. Joint $o$ may be used or omitted, as desired.

Seat B is provided with the jumping-irons $x$, or equivalent devices by which to jump and support it, and seat C is hinged by bars $u$ upon the pintles $s$, Figs. 5 and 6, of arm $p$ of the front iron, $c$, and the front of this seat is supported by legs $v$, in the manner described in my said former patent; but, as before stated, any equivalent devices may be used with said seats.

For purposes of shipment, the top is removed from the body by disconnecting the bows from supporting-irons $b$ $c$ and disconnecting joint $l$ either from the body or bow, when the top may be removed and folded closely together.

By thus combining a folding top instead of a canopy-top with a jump-seat and turn-down seat, I am enabled to ship twenty-five carriages of the former kind in the same car that would contain but eight of the latter kind, (all other parts being equal;) and as such freight is estimated by the car-load, I save more than two-thirds of the freight expenses.

The front supporting-irons (shown fully in Figs. 5 and 6) are formed, as heretofore, with the lower member, $r$, to be secured to the side pillar, the arm $p$, and pintle $s$, and recess $t$ for support of seat B, and the additional member $c$ to receive the slat-irons.

The hinge-bars $u$ are enlarged at the front ends and formed with a longitudinal recess, in which is secured spring $w$, which serves to bring leg $v$ in contact with its catch $y$ at the bottom.

I claim as my invention—

1. In a jump-seat carriage, the combination of a jump or sliding seat, a turn-down or folding seat, and a turn-down top, such top being attached to and supported by the body of the vehicle outside of and independent of such seats, substantially as described and shown.

2. In a jump-seat carriage, the combination of a jump or sliding seat, a turn-down or folding seat, and an extensible turn-down top, which is attached to and supported by the body of the vehicle outside of and independent of such seats, substantially as described and shown.

3. In a jump-seat carriage, the combination of a jump or sliding seat, a turn-down or folding seat, and a removable turn-down top attached to and supported by the body of the vehicle outside of and independent of such seats, substantially as described and shown.

4. The front supporting-irons, formed with the member $r$, for attachment to the body, the arm $p$, for attachment and support of the front seat, recess $t$, for reception of seat B, and the member $c$, for attachment of the slat-irons, all substantially as described and shown.

5. The hinge-bar $u$, enlarged and recessed at the front end, in combination with seat-support $v$ and spring $w$, substantially as specified.

ELBRIDGE S. FELTCH.

Witnesses:
EUGENE HUMPHREY,
T. W. PORTER.